May 12, 1964   J. Y. DAHLSTRAND ETAL   3,132,730
TORQUE DISCONNECT SAFETY COUPLING
Filed Aug. 31, 1960
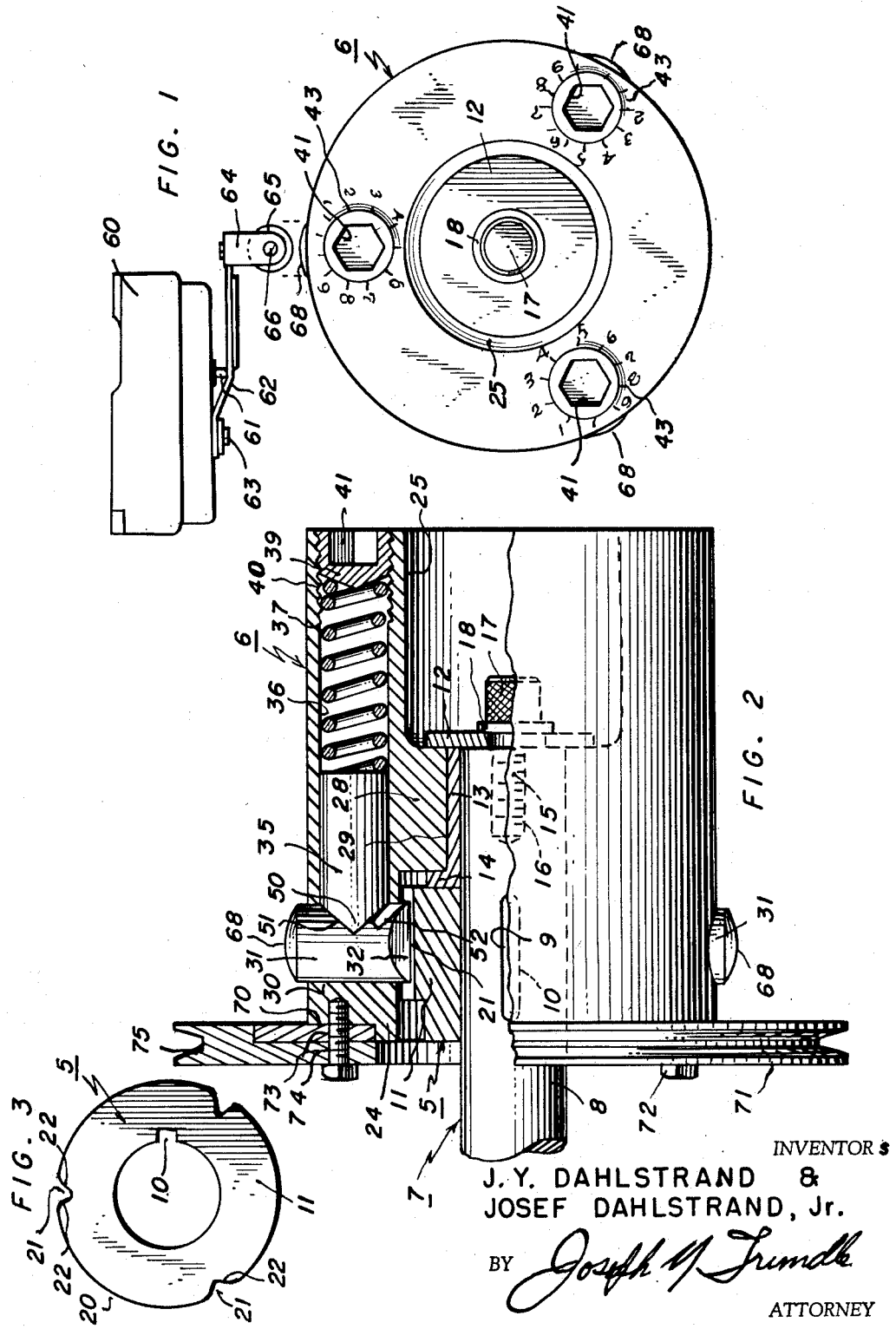
INVENTORS
J. Y. DAHLSTRAND &
JOSEF DAHLSTRAND, Jr.
BY Joseph N. Trundle
ATTORNEY

United States Patent Office 3,132,730
Patented May 12, 1964

3,132,730
TORQUE DISCONNECT SAFETY COUPLING
Josef Y. Dahlstrand, Castleton, Ind. (811 E. 58th St., Indianapolis, Ind.), and Josef Y. Dahlstrand, Jr., Castleton, Ind. (6221 N. Oakland Ave., Indianapolis, Ind.)
Filed Aug. 31, 1960, Ser. No. 53,155
1 Claim. (Cl. 192—56)

The present invention relates to improvements in safety shaft couplings, clutches and the like, and more particularly to a torque responsive overload release coupling or clutch which will normally maintain a driving and driven shaft in coupled engagement and will disconnect said shafts when the torque or overload approaches or exceeds a predetermined limit.

One object is to provide a torque overload release coupling which will automatically operate to disconnect a driving member from a driven member when the torque value exceeds a predetermined limit and to maintain said members disconnected or uncoupled after release until the cause of the overload has been detected and eliminated.

Another object is to provide a torque release coupling which can be adjusted to respond to torque overloads of various limits and torque conditions.

Another object is to provide a torque release coupling having radially movable coupling plungers yieldingly held in an operative position which are moved outwardly and radially when the coupling is overloaded to release the plungers and will be held in a position in which the inner ends are out of engagement and contact with the notched cam member.

Another object is to provide a torque responsive release coupling in which the coupling plungers are moved outwardly under overload conditions and engage the arm of a micro-switch to interrupt a circuit through a prime mover such as an electric motor.

Another object resides in the provision of a torque release coupling which can easily be re-set and restored to its operative position after the overload conditions have been remedied.

Another object is to provide a novel cam collar having a series of cam notches and lobes arranged to project the yieldingly retained coupling plungers a short distance so that they may be locked against further radial movement upon coupling release to hold the inner ends of the coupling plungers out of engagement with the cam collar surface.

Another object is to provide a torque release coupling having radial coupling plungers provided with a pair of closely spaced notches for receiving a spring loaded detent plunger engageable with the notches to alternately hold the coupling plungers in an operative position, and when the coupling is released to retain the plungers in an inoperative position and out of engagement with the cam collar thus preventing wear of the various parts by the elimination of rubbing contact therebetween.

Another object resides in the provision of a torque release coupling in which the spring loaded detent plungers are provided with calibrated regulating screws to increase or decrease the spring tension on the detent plungers and to permit all of the loading springs to be pre-set to a single calibrated setting and exert equal pressure on the respective detent plungers.

Another object is to provide an overload release clutch or coupling in which the cam collar or hub is so shaped as to move the coupling plungers a very short radial distance when the coupling is overloaded and released, and in which the cam surfaces are so shaped as to engage the beveled ends of the coupling plungers and move the same outwardly against the yielding action of the detent plungers which are again projected into the second notch of the coupling plunger to retain the coupling plunger in an inoperative position.

Other objects and advantages of the invention will become apparent during the course of the following description of the accompanying drawing wherein:

FIGURE 1 is an end elevational view of the overload release coupling embodying the present invention and showing the calibrated adjusting screws for adjusting the spring tension of the detent plungers.

FIGURE 2 is a side elevational view of the overload release coupling showing a portion thereof broken away and in section to illustrate various structural details and the arrangement of the coupling plungers and spring loaded detents, and FIGURE 3 is an end elevational view of the notched cam hub or collar illustrating the manner in which the peripheral surface is notched and provided with cam lobe portions.

In the drawing, and more in detail, there is shown one embodiment of the invention and attention is directed to FIGURE 2 wherein there is shown a rotary driving member generally indicated 5 rotatably mounted within a rotary body generally indicated 6. A driving shaft generally indicated 7 is connected to a prime mover such as an internal combustion engine or electric motor. The shaft 8 may be of any desired length and is provided with a longitudinally extending keyway 9 for receiving a key (not shown) which is received in a correspondingly shaped slot 10 in the driving member 5.

The driving member 5 is in the shape of a cam collar or hub 11 (FIGURE 3) and is secured to the end of the shaft 8 and held against displacement by means of a washer 12 which bears against a retaining collar 13. The inner end of the collar 13 is flanged as at 14 to provide a thrust bearing surface for the driving member 5. A knurled locking screw 15 is received in a correspondingly threaded opening 16 in the end of the shaft and has its enlarged knurled end 17 provided with a flanged portion 18 engaging the bearing washer 12.

The peripheral surface 20 of the driving member 5 is provided with a series of circumferentially spaced notches 21 and said notches merge with the peripheral surface by curved cam lobe portions 22 arranged on opposite sides of the slot 21.

The rotary body 6 is adapted to rotate with respect to the cam collar or hub 11 and said body 6 is of general cylindrical shape 23 having a bore 24 extending inwardly from one end and a bore 25 extending inwardly from the opposite end. The bores 24 and 25 are of substantially the same diameter and terminate intermediate the ends of the cylindrical body 23 to form an inwardly extending annular projection 28 having a central bore 29 for receiving the bearing sleeve 13. One end of the inwardly extending annular projection 28 forms an abutment for the flange 14 while the other wall forms a bearing surface for the washer 12.

Thus, the rotary body 6 is freely rotatable upon the cam collar or hub 11 and if desired, the bore 25 may be provided with a keyway for receiving a shaft having a correspondingly aligned spline or locking rib.

Formed in the rotary body 6 is a series of circumferentially spaced apart radially extending bores 30 for receiving coupling plunger pins 31 the inner ends of which are pointed as at 32 to conform to the shape of the notches 21 in the cam collar or hub 11. The coupling plungers or pins 31 are radially movable and are yieldingly held in position with the pointed ends 32 in the notches 21 by longitudinally slidable detent plungers 35 received in longitudinal bores 36 extending inwardly from one end of the cylindrical body 23. A coil spring 37 is provided in each of the bores 36 and the end of the bore is closed by means of a screw plug 39 received in a correspondingly threaded portion 40 of the bore 36. The plug 39 is provided with a socket 41 for receiving an Allen wrench and the outer radial wall of the plug 39 is provided with a marker 43 adapted to register with a series of circumferentially spaced graduations 44. Thus, the threaded plugs 39 can be easily adjusted by positioning the corner marker 43 to the desired graduation 44 which will enable all of the screw plugs 39 to be adjusted a corresponding amount to exert equal pressure on the cooperating compression springs.

The ends of the detent plungers 35 are pointed as at 50 and are adapted to be received in a pair of closely spaced notches 51 and 52. The notches 51 and 52 are spaced so that the adjacent annular walls of the notches 51 and 52 extend in planes which intersect at a point internally of the circumference of the plunger 31, and as indicated in FIGURE 2 the respective walls of the V-shaped notches 51 and 52 form an included angle of approximately 90°.

Mounted adjacent the rotary body 6 is a micro-switch 60 (FIGURE 1) having a normally closed switch contact in circuit with a driving motor for the shaft 8 and said switch is provided with a contact plunger 61 which is adapted to be engaged by an offset spring arm 62 secured to the switch casing by a threaded fastener 63. The opposite end of the spring arm is fashioned to provide a yoke 64 between the arms of which is mounted a roller 65 on a bearing pin 66. The micro-switch 60 is located in a position adjacent the rotary body 6 so that the roller 65 will be presented in the path of the coupling plungers 31 when the plungers have been released due to an overload and are projected radially. The end portions of the coupling plungers 31 are rounded as at 68 so that they will engage the roller 65 and depress the spring arm 62 to open the switch 60 by engaging the contact plunger 61.

Optionally, one end of the rotary body 6 may be cut away to form a recess 70 for receiving a pulley 71 which is held in place by a series of circumferentially spaced threaded fasteners 72 which pass through aligned openings 73 in the pulley 71 and are received in correspondingly threaded openings 74 in the end of the cylindrical body opposite the adjusting screw plugs 39. The pulley 71 is provided with a V-belt pulley groove 75 which can be drivingly connected to the machine for which the coupling is intended.

The micro-switch 60 is of conventional design and the actuating arm 62 is formed of spring metal to yieldingly maintain the roller 65 in closely spaced relation from the periphery of the rotary body 6.

In operation, it would be assumed that the shaft 7 is connected to a motor for driving the member 5 and a shaft inserted in the bore 25 as above described and not shown. Under driving conditions, the coupling pins 31 are held in position as shown in FIGURE 2 with their inner pointed ends 32 received in the notches 21 of the cam collar 11 by the spring loaded detent plungers 35, with the pointed end 50 of the plunger 35 received in the V-shaped notch 51 of the coupling plunger 31. When the springs 37 are nicely adjusted by the screw plugs 39 so that the tension exerted on the plungers 35 is substantially equal the coupling plungers 31 will be held in place for normal driving loads. Upon an overload on the cylindrical body 6 imposed thereon through the shaft in the bore 25 or optionally through the pulley 71 the cam collar 11 will exert a force radially on the coupling plungers 31 by reason of the cam surfaces 22. When the coupling plungers 31 are thus moved radially during a torque overload the detent plungers 35 are moved to the right (FIGURE 2) against the action of the spring 37 so that the pointed end 50 will then be received in the notch 52 in the coupling plunger 31 to hold the same in its release position with the pointed ends 32 of the coupling plungers 31 out of engagement with the notches 21 in the cam collar 11 and spaced clear of the peripheral surface 20 thereof. This structure permits the coupling plungers 31 to be held out of engagement with the cam collar 11 and in position to engage the roller 65 of the micro-switch arm 62 and open the circuit through the micro-switch 60 to the driving motor for the shaft 8.

To re-set the releasable torque coupling the coupling plungers 31 are aligned with the notches 21 in the cam collar 11 and are struck a blow with a mallet or the like to force the plunger inwardly so that the pointed end 50 of the detent plunger 35 will again engage within the notch 51 of the respective plungers.

It is to be understood that the form of the invention herewith shown and described is to be taken as a preferred embodiment, and that various changes in the shape, size and arrangement of parts may be resorted to without departing from the spirit of the invention or the scope of the subjoined claim.

What we claim is:

In a torque release coupling, a drive shaft, a rotary hub, fixed on said drive shaft, said rotary hub having a cylindrical outer periphery with circumferentially spaced notches therein, said notches being substantially V-shaped and extending axially of said hub, a cylindrical housing rotatably mounted on said shaft and circumferentially disposed about said hub, a radial piston slidably disposed in said housing and having an inner end for engagement in said notches for releasably engaging and locking said hub and housing in driving relation, said inner end being shaped to conform to the surface area of said notches, so said end is in substantially straight line contact with a substantial area of said V-shaped notches when said hub and housing are engaged in driving relation, said housing having a radially extending bore receiving said radial piston, said housing having an axially extending bore intersecting said radially extending bore, an axial piston slidably disposed in said axial bore, said radial piston having inner and outer notches disposed in the periphery thereof and facing said axial piston, said inner and outer notches being disposed in contiguous side-by-side relation and each being V-shaped and intersecting each other at a point internally of the circumference of the radial piston to provide an overall W-shaped configuration, said axial piston having an end conformed to fit into said inner and outer V-shaped notches and adapted to be engaged in said outer notch when said hub and housing are engaged in driving relation to resist the torque, and engaged in said inner notch when the inner end of said radial piston is disconnected from said circumferentially spaced notches, a spring disposed in said axial bore continuously biasing said axial piston against said radial piston, spring adjusting means for adjusting the force in said spring, said spring being adapted to engage the end of said axial piston in said outer notch when said hub and housing are in driving relation, and to permit the end of said axial piston to slip into said inner notch and force said radial piston and its inner end outwardly beyond the circumference of said hub to disconnect said hub and housing when a predetermined torque load occurs, and hold it disconnected until the coupling is reset References Cited in the file of this patent

UNITED STATES PATENTS

| 716,857 | Bovin | Dec. 30, 1902 |
| 1,579,057 | Asbury | Mar. 30, 1926 |
| 2,045,572 | Dow | June 30, 1936 |
| 2,102,002 | Hill | Dec. 14, 1937 |
| 2,137,417 | Schaefer | Nov. 22, 1938 |
| 2,412,630 | Nelson | Dec. 17, 1946 |
| 2,753,029 | Babaian | July 3, 1956 |
| 2,781,118 | Pechy | Feb. 12, 1957 |